United States Patent
Berndt et al.

(10) Patent No.: US 8,205,727 B2
(45) Date of Patent: Jun. 26, 2012

(54) ELECTROMAGNETIC PERMANENT MAGNET BRAKE

(75) Inventors: Jurgen Berndt, Villingen-Schwenningen (DE); Erwin Messner, Bad Durrheim (DE); Dirk Bottcher, Neuhausen (DE)

(73) Assignee: Kendrion Binder Magnete GmbH, Villingen-Schwenningen (DE)

( * ) Notice: Subject to any disclaimer, the term of this patent is extended or adjusted under 35 U.S.C. 154(b) by 1357 days.

(21) Appl. No.: 11/815,824

(22) PCT Filed: Aug. 27, 2005

(86) PCT No.: PCT/EP2005/009256
§ 371 (c)(1),
(2), (4) Date: Aug. 8, 2007

(87) PCT Pub. No.: WO2006/087017
PCT Pub. Date: Aug. 24, 2006

(65) Prior Publication Data
US 2008/0136279 A1    Jun. 12, 2008

(30) Foreign Application Priority Data

Feb. 15, 2005  (DE) .................... 10 2005 006 699

(51) Int. Cl.
*B60L 7/00* (2006.01)
(52) U.S. Cl. ........ 188/161; 188/158; 188/163; 188/164; 188/171; 310/76; 310/77
(58) Field of Classification Search .................. 188/158, 188/161, 163, 267; 192/84.31; 310/77, 93, 310/103
See application file for complete search history.

(56) References Cited

U.S. PATENT DOCUMENTS

| | | | | |
|---|---|---|---|---|
| 2,899,037 A | * | 8/1959 | Pierce | 192/84.31 |
| 5,121,018 A | * | 6/1992 | Oldakowski | 310/77 |
| 5,490,583 A | * | 2/1996 | Anderson et al. | 188/161 |
| 5,847,478 A | * | 12/1998 | Usui et al. | 310/76 |
| 5,873,436 A | * | 2/1999 | Schneider | 188/158 |
| 6,244,395 B1 | * | 6/2001 | Schlagenhaft | 188/161 |

(Continued)

FOREIGN PATENT DOCUMENTS
DE         2638944        3/1978
(Continued)

*Primary Examiner* — Robert A Siconolfi
*Assistant Examiner* — San Aung
(74) *Attorney, Agent, or Firm* — Volpe and Koenig, P.C.

(57) ABSTRACT

An electromagnetic brake (20), in particular for an electric drive is provided, having a brake body (3), which is provided with a sleeve-shaped permanent magnet (4), an electromagnet (5) with an exciting coil (6), an external ring in the form of an external pole and an internal ring (8) in the form of an internal pole, wherein an armature disc (12) rotatably connected to a shaft is attractable against the brake body (3) or the external or internal ring surfaces by the permanent magnet (4) force acting against a return spring force. When the exciting coil is powered, the permanent magnet (4) magnetic field is compensated in such a way that the armature disc (12) is lifted up from the brake body (3) by the spring force, thereby allowing the brake to be released. A radial cross-sectional dimension or cross-sectional thickness d of the permanent magnet (4) is smaller than the axial dimension thereof and a spatial arrangement, viewed in the axial direction, is provided between the armature disc (12) and the exciting coil (6) in the area radially external with respect to the exciting coil (6) or the housing thereof.

17 Claims, 2 Drawing Sheets

U.S. PATENT DOCUMENTS 7,063,190 B1 * 6/2006 Sylvan et al. ................ 188/161

FOREIGN PATENT DOCUMENTS

| | | |
|---|---|---|
| DE | 8501283 | 2/1985 |
| DE | 8615856 | 10/1987 |
| DE | 19946084 | 4/2001 |
| DE | 202004001042 | 7/2004 |
| EP | 0693633 | 1/1996 |
| FR | 2721080 | 12/1995 |

* cited by examiner

ELECTROMAGNETIC PERMANENT MAGNET BRAKE

BACKGROUND

The invention relates to an electromagnetic brake, in particular, for an electric drive comprising at least one brake body, which has at least one permanent magnet, at least one electromagnet with an electromagnetic exciting coil, an external pole formed as an external ring, and an internal pole formed as an internal ring, wherein the brake body is locked in rotation—directly or indirectly—in particular, with the stator of a preferably electric drive, wherein the armature disc forms a magnetic circuit with the internal pole and also with the permanent magnet via an air gap, and wherein the armature disc can be drawn against the brake body by the magnetic force of the permanent magnet opposite the force of a spring and, when the exciting coil is energized, the electromagnet compensates, neutralizes, displaces, or deflects the magnetic field of the permanent magnet at least to the extent that the armature disc can be or is lifted from the brake body via the spring force.

Such electromagnetic brakes are known in various constructions and are used primarily for electric drives, where they can be imagined as stopping brakes in servomotors. The electromagnetic brake must be able to hold the drive in the electrically voltage-free state with or without play and without residual torque and it also must be able to brake the drive in case of an emergency from a certain rotational speed for a certain moment of inertia. With the help of such an electromagnetic brake, which is also designated as a permanent magnet brake, a braking moment should be able to be generated that deviates as little as possible during the service life of the brake.

For this purpose, it was previously known to provide an annular disc-shaped permanent magnet, which acts in the axial direction and whose magnetic field exits or enters perpendicular to the direction of the armature disc in the area of the internal pole and external pole, respectively. Therefore, normal magnetic forces of attraction are produced on the armature disc in the area of the internal pole and the external pole. Through a current flowing in the exciting coil, the electromagnet acts on the magnetic circuit made of the brake body and armature disc. In the non-energized state of the electrical exciting coil, there is no air gap. If current is introduced, the field of the permanent magnet is canceled by the electromagnet in the area of the poles and the armature and the restoring spring constructed, for example, as a leaf spring, pulls the armature disc away from the poles.

Such permanent magnet brakes have a fundamental disadvantage, namely that after the brake is opened, if the current in the exciting coil increases past a certain value ("repeated pull-in current") the electromagnet significantly overcompensates for the field of the permanent magnets at the poles and leads to an undesired repeated pull-in of the armature disc against the brake body. The resulting range of the exciting current, in which the brake is opened or remains open ("air window"), should be as large as possible, so that the brake can be used safely in a wide tolerance range of exciting voltage and ambient temperature.

Due to the installation situation, here the cross section of the electromagnetic brake should not extend past the cross section of the drive, but instead, optionally, the brake should even be able to be integrated into the crankcase. In this way and due to the disc-shaped construction of the permanent magnet, the braking moment is limited because for it to increase, the radial extent of the annular disc-shaped permanent magnet would have to be increased, which is usually not possible due to the available installation space.

SUMMARY

Therefore, there is the objective of creating an electromagnetic brake of the type noted above, which produces, practically without increasing its cross section or diameter or even with a possibly reduced diameter or cross section, a higher torque or braking moment as much as possible over the entire service life of the brake, wherein the largest possible air window of the exciting current should be allowed.

To meet this apparently contradictory objective, the electromagnetic brake defined above is characterized in that the radial cross-sectional dimension of the permanent magnet generating the braking force is smaller than its axial dimension between its internal diameter and its external diameter, and the spatial arrangement of the permanent magnet is provided in the axial direction between the armature disc and the exciting coil.

In this way, a permanent magnet is produced, whose radial annular cross section is smaller than its axial extent, which can be enlarged accordingly and practically arbitrarily for increasing the magnetic force, that is, the extent of the permanent magnet can be increased in the axial direction, without increasing the cross section or diameter dimension of the brake. If need be, the brake is increased in the axial direction, which, however, also can be prevented if the permanent magnet is arranged in a space-saving configuration between the internal pole and the external pole. A significantly increased torque relative to a known electromagnetic brake with an annular disc-shaped permanent magnet can be achieved in practice with the tightest utilization of a geometrically preset external dimension or external diameter. Here, in an especially advantageous and useful way, the spatial arrangement of the permanent magnet is in the axial direction between the armature disc and the exciting coil, because therefore, the magnetic flux can run along the shortest possible path via the poles through the armature and thus is preferred relative to the field of the electromagnet. This leads to a higher repeated pull-in current of the exciting coil and to a large air window of the exciting current, which allows an improvement in the temperature response of the brake.

The permanent magnet can have a sleeve-shaped or collar-shaped construction.

Furthermore, it is useful if the permanent magnet is arranged in the radially outer area of the exciting coil or its housing. The greater the radius of the permanent magnet is, the greater this permanent magnet is itself. It is especially advantageous that the poles formed by the external ring and by the internal ring also come to lie at a correspondingly larger radial distance to the center axis of the brake due to this arrangement of the permanent magnet in the outer peripheral area of the exciting coil or the housing of the exciting coil and therefore have the largest possible radius of friction, that is, can generate a correspondingly large torque as the braking moment. Here, the small spacing of the two poles according to the invention has the advantage that the braking moment or torque deviations possibly appearing due to individual poles of different strengths and percentage of contact area are as small as possible. These special advantages are here assisted by the arrangement according to the invention of the special sleeve-shaped or collar-shaped permanent magnet in the axial direction between the armature disc and the exciting coil.

The permanent magnet can be arranged with a sleeve shape between the external ring and the internal ring of the brake body and can be magnetized in the radial direction and the external pole as well as the internal pole can be arranged, in particular, in one plane. This radial arrangement of the permanent magnet and the axially same-height arrangement of the internal ring and the external ring produce a significantly increased torque, for example, two-times the torque, due to an elevated or enlarged magnetic area and an equal support from the beginning. Because an equal and complete friction surface is available over both poles, the brake according to the invention allows an essentially constant torque over its service life.

The open spacing of the two poles located in the radial direction on both sides of the permanent magnet and formed by the external ring and the internal ring can correspond at least to the radial cross-sectional thickness of the permanent magnet. In this way, the torque and power density is optimized in the best possible way, because this spacing between the two poles is relatively small, that is, the two effective poles can lie very close to each other. Also, the effectiveness of the permanent magnet can be utilized to a correspondingly good degree. The tight arrangement of the two poles and the permanent magnet increases the magnetic force of attraction for the armature disc and thus also the torque.

Here, it can be useful when this minimum spacing of the poles is increased relative to the radial thickness of the permanent magnet, so that a free space is produced between the end side of the permanent magnet and in this increased spacing of the two poles relative to each other. This free space can be optimized according to the requirements of the magnetic flux and has the additional advantage of being able to receive any resulting abrasion fines.

A modified embodiment can provide that the spacing of the poles is closed or filled up by non-magnetic material. This prevents any abrasion fines from remaining inside the brake system.

The axial dimension of the permanent magnet can exceed several times its radial cross-sectional thickness, that is, the difference between its internal diameter and its external diameter. Thus, a "permanent magnet sleeve" of relatively large axial dimension can be provided, which simultaneously needs less space in the radial direction between the external ring and internal ring or external pole and internal pole, so that the external ring and internal ring can form correspondingly large pole surfaces, without creating a larger radial dimension of the brake.

For generating the spring force acting on the armature disc, at least one tension spring, one compression spring, and/or one tensioned and riveted or screwed segmented spring can be provided for generating the axial restoring force on the armature disc, especially several tension springs or segmented springs, which are arranged on the periphery of the armature disc arranged concentric to the shaft and which is/are arranged in a flange, which limits the armature disc in the axial direction in terms of its axial adjustability and which is at the highest radial position on the side of the armature disc facing away from the permanent magnet relative to the shaft. The flange simultaneously forms the stop for the armature disc when this is pulled back by the restoring springs from the braking surface or from the internal pole and the external pole, because the electromagnet is energized.

Here, the flange containing the tension springs or segmented springs acting as such can be connected, especially integrally, to a sleeve locked in rotation with the shaft of the drive and the armature disc can be arranged locked in rotation on the outer side of this sleeve but adjustable in the axial direction by the air gap.

The sleeve-shaped or collar-shaped permanent magnet can be fixed between the external ring and internal ring such that the external ring is connected to the internal ring by means of a shrink fit with the permanent magnet in-between. The radial arrangement according to the invention of the permanent magnet between the internal ring or brake internal body and the external ring or brake external body and also the armature disc can be fixed and realized, such that the cold internal ring with the still non-magnetic radially acting permanent magnet is preassembled and then set into the external ring heated, for example, to 200 degrees Celsius or this external ring is pushed over the permanent magnet. After the external ring cools, this external ring, the permanent magnet, and the internal ring are connected rigidly to each other, wherein simultaneously the smallest air gap between the external ring and the internal ring as well as the permanent magnet can be guaranteed. A cost-effective, permanent connection is produced.

Here it is possible that the permanent magnet is composed of individual segments arranged one next to the other in the peripheral direction. This applies primarily when the fixing is realized by a shrink fit, so that the individual segments can no longer lose their exact position relative to each other.

Modifying the brake according to the invention can provide that the brake body has a brake lining. Therefore, the brake can also be used as a so-called work brake.

Primarily for the combination of individual or several of the previously described features and measures, an electromagnetic brake is produced, for which the friction force is distributed in the area of the internal pole and the external pole equally, so that the achievable torque or the achievable braking force can have the desired magnitude from the beginning, which can be amplified or considerably amplified by the radially arranged or sleeve-shaped permanent magnet according to its axial dimension.

Here, this radial or sleeve-shaped arrangement and construction of the permanent magnet allows a modified and improved interface, for example, to the motor bearing shield, on which the brake can be screwed without tension. Due to the higher magnetic force of the sleeve-shaped permanent magnet, which can be increased accordingly in the axial direction, a higher electrical power is indeed needed on the exciting coil of the electromagnet or electromagnets, but it has been shown that this electrical power of the coil decreases relative to the increase in the torque or braking moment relative to conventional solutions. Advantageously, it is possible with the brake according to the invention to reduce the overall size for the same torque relative to known brakes or to achieve a higher braking force for the same overall size, so that the brake according to the invention also has a considerable economic advantage.

Another especially useful construction of the invention can provide that a second permanent magnet, whose radial cross-sectional dimension or cross-sectional thickness is, in particular, smaller than its axial dimension, is arranged between the external ring and internal ring on the side of the exciting coil facing away from the first permanent magnet and the armature disc in the axial direction, and that on the end of this second exciting coil facing away from the exciting coil, a second armature disc is provided, which acts on the same shaft as the first armature disc.

Through these features, a double brake is produced, in which on both sides of the exciting coil there are permanent magnets and armature discs, wherein on the second side, the permanent magnet is also arranged between the exciting coil and the armature disc. Such a double brake requires only a single exciting coil. Also here, the magnets are magnetized in the radial direction but on the two opposite sides of the exciting coil each in the reverse direction. Such an arrangement produces a further increased braking moment for a somewhat enlarged copper volume, but only a single electrical connection. In comparison to the use of two brakes, which work on a common shaft, savings are produced in terms of components and overall length. In particular, if both sides or halves are equal, a brake is produced for applications with increased safety requirements, for example, for people and cargo elevators, because both sides represent braking systems that are independent from each other and are thus redundant. In contrast, the release for the brake is provided only once, which, however, is sufficient, because when the exciting coil is not energized, the secure braking state is maintained—redundantly.

A structurally useful arrangement is produced when the external ring projects past the exciting coil according to two opposite sides in the axial direction and encloses the first permanent magnet and the second permanent magnet on the outside and when the inner side of the second permanent magnet contacts a second internal ring, so that the external pole of the second permanent magnet is formed by the external ring elongated in the axial direction and the internal pole is formed by the second internal ring. Thus, both sides of this double brake are constructed approximately equally.

Here, the second permanent magnet can have the same diameter and the same cross-sectional thickness as the first permanent magnet and can align with the first permanent magnet. Thus, matching diameter relationships are produced on both sides of this double brake.

Also, the axial dimension of the second permanent magnet can correspond to that of the first permanent magnet. Therefore, for both halves of this double brake, a practically matching dimension and construction and thus also an essentially matching braking force is achieved.

In a useful way, both permanent magnets and also their attachments and the parts interacting with them, especially the armature discs and/or the springs are arranged mirror-symmetric to the common electromagnet or its exciting coil and constructed, incidentally, in a matching way. From this, the double brake with its two halves, is provided and has the features and measures already described above for a single brake.

BRIEF DESCRIPTION OF THE DRAWINGS

An embodiment of the invention is described in more detail below with reference to the drawing. Shown partially in a schematized representation are.

DETAILED DESCRIPTION OF THE PREFERRED EMBODIMENTS

Figure 1:
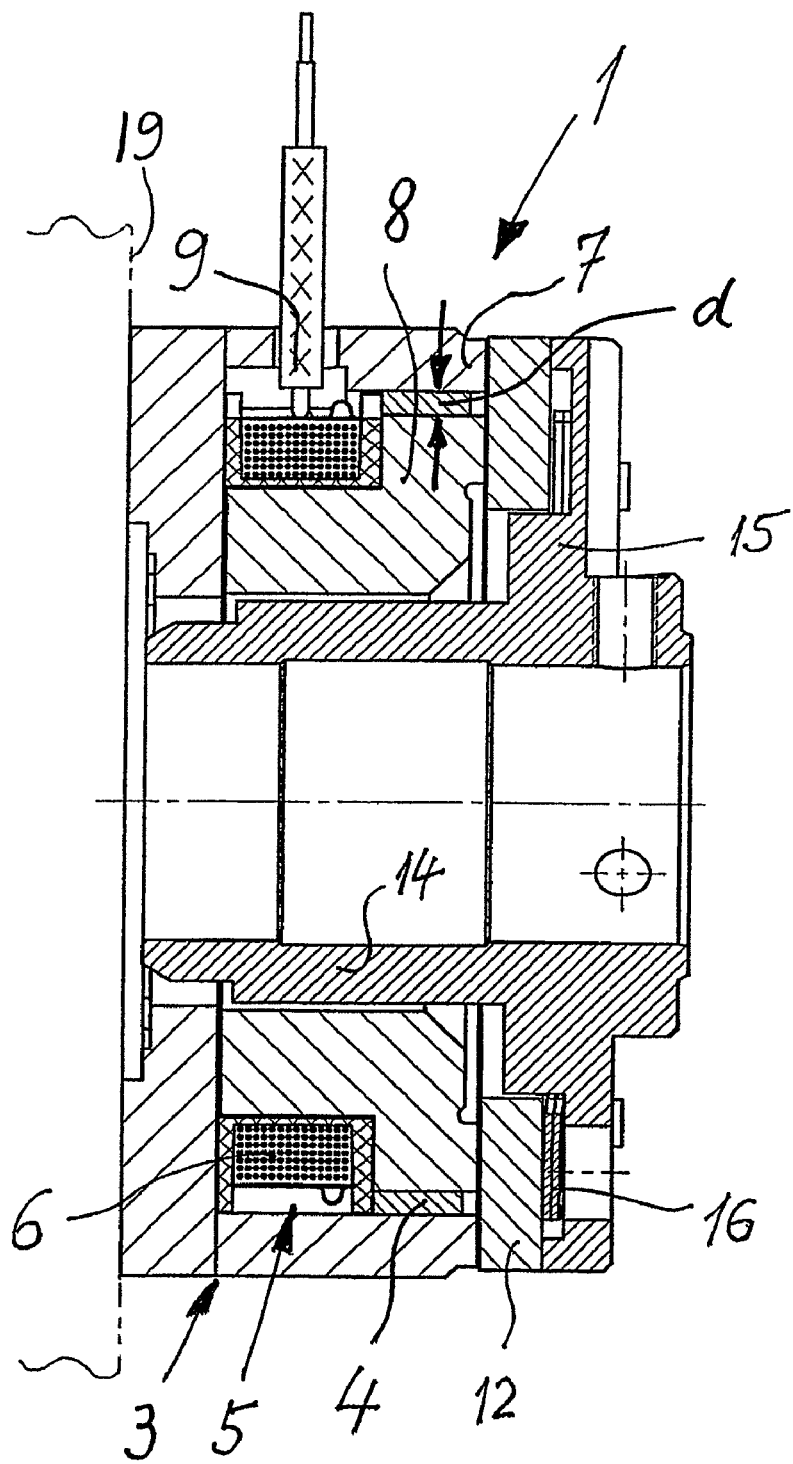
FIG. 1 a longitudinal cross-sectional view of an electromagnetic brake according to the invention with an external pole formed as an external ring and an internal pole formed as an internal ring, between which there is a sleeve-shaped permanent magnet, whose radial cross-sectional thickness is considerably smaller than an axial dimension, wherein this sleeve-shaped permanent magnet is arranged, seen in the axial direction, between the armature disc and the exciting coil of the brake, and also FIG. 2 a longitudinal cross-sectional view of an electromagnetic brake according to the invention, for which sleeve-shaped permanent magnets and armature discs are arranged in an approximately mirror-symmetric way on both sides of the electromagnet or the exciting coil, so that a double brake acting on a common shaft is formed.

In the description below of the two embodiments, parts that match in function, even for a somewhat modified shaping or formation, are given matching reference numbers.

An electromagnetic brake designated as a whole with 1 is provided for an electric drive that is not shown in more detail and has a brake body 3, which comprises a permanent magnet 4, at least one electromagnet 5 with an electromagnetic exciting coil 6, an external pole formed as an external ring 7, and an internal pole formed as an internal ring 8. Here, in FIG. 1 one can see the cord or a plug 9 connected from above to the exciting coil 6.

The brake body 3 is locked in rotation in the position of use, for example, in a known way, with the stator 19 of the electric drive via the bearing shield.

According to FIG. 1, this electric brake 1 includes an armature disc 12, which is locked in rotation with the rotatable shaft of the drive indirectly, namely via a sleeve 14 still to be described and a flange 15 arranged on this sleeve, wherein the armature disc 12, with the permanent magnet 7 and with the internal pole 8, as well as with the permanent magnet 4, forms a magnetic circuit via an air gap that cannot be seen in the drawings and wherein the armature disc 12 can be drawn at the end against the brake body 3 or its external ring 7 and internal ring 8 by the magnetic force of the permanent magnet 4 opposite the force of springs 16 also still to be described. If the exciting coil 6 of the electric magnet 5 is not energized, then the braking force is active. By energizing the exciting coil, the magnetic field of the permanent magnet 4 can be compensated, neutralized, displaced, or deflected to the extent that the armature disc 12 can be or is lifted from the brake body 3 or the end faces of the external ring 7 and internal ring 8 by means of the spring force of the springs 16. If the current is removed, the brake 1 is closed.

Here it is provided that the radial cross-sectional dimension or cross-sectional thickness d of the permanent magnet 4, that is, the dimension between its internal diameter and its external diameter, is smaller than its axial dimension. In FIG. 1, one can clearly see that this radial cross-sectional dimension or cross-sectional thickness d is small relative to the axial length of the permanent magnet 4, that is, the permanent magnet 4 can be selected larger in the axial direction, without the extent or cross section or diameter of the brake 1 becoming larger, so that the magnetic force can be increased without such a cross-sectional increase. Here, the axial dimension of the permanent magnet 4 exceeds its radial cross-sectional thickness d several times and in the shown embodiment by approximately three-times or four-times, wherein, however, a smaller or larger relation of these dimensions can be selected according to the desired magnetic force strength.

The permanent magnet 4 is thus arranged with a sleeve-like shape between the external ring 7 and the internal ring 8 of the brake body 3 and in this way magnetized in the radial direction, in order to form a magnetic circuit via the external ring 7 and the internal ring 8 with the armature disc 12, wherein for accommodating the permanent magnet 4 the spatial extent of the internal ring 7 and external ring 8 can be utilized to the extent that the permanent magnet 4 can be located within the space needed by this magnet.

For generating the spring force acting on the armature disc 12, leaf spring-shaped segmented springs 16 are tensioned and riveted with the flange 15 and provided at the periphery concentric to the shaft or to the armature disc 12, so that the flange 15 has an additional function, in that it accommodates these segmented springs 16. In addition, this flange 15 limits the axial motion of the armature disc 12 away from the brake body 3 and is at the highest radial position on the side of the armature disc 12 facing away from the permanent magnet 4 relative to the shaft or sleeve 14.

Here, one can see in both embodiments that the flange 15 containing the tension springs 16 or the segmented springs acting as such is connected integrally to the sleeve 14 locked in rotation with the shaft in the position of use and the armature disc 12 is arranged locked in rotation on the outside of this sleeve 14 but adjustable axially about the air gap. Thus, overall a compact brake 1 is produced, which can be preassembled, in order to then connect it to the shaft and the drive.

Here, it can be easily seen that the sleeve-shaped or collar-shaped permanent magnet 4 contacts the internal ring 8 and the external ring 7 with its internal and its external surface, which run parallel to each other, and consequently can be fixed between the external ring 7 and internal ring 8, such that the external ring 7 can be connected to the internal ring 8 through a shrink fit with the permanent magnet 4 in-between. In practice, the internal ring 8 can be provided with the sleeve-shaped permanent magnet 4 and then the external ring 7 heated, for example, to 200° C. can be placed or the internal ring 8 with the permanent magnet 4 can be inserted or pushed into this heated external ring 7, after which the three parts—when the external ring 7 has cooled—are fixed rigidly to each other and no additional attachment measures are needed.

Here, the permanent magnet 4 can also be made from individual segments arranged one next to the other in the peripheral direction.

In a way not shown in more detail, the brake body 3 can have a brake lining, where in the embodiment, at this position a gap is opened. This gap could be filled with a brake lining if the brake area is to be used, for example, as a work brake or dynamic brake.

In such a case, the brake lining between the external ring 7 and the internal ring 8 can be flush with the end faces of the external ring 7 and the internal ring 8 facing the armature disc 12.

In FIG. 1 it is shown that the spatial arrangement of the permanent magnet 4 is provided in the axial direction between the armature disc 12 and the exciting coil 6. Simultaneously, one can see that this permanent magnet 4 with a sleeve shape or assembled from segments is arranged in the radially outer area of the exciting coil 6 or its housing, that is, it has the largest possible diameter.

This direct arrangement of the permanent magnet 4 in the axial direction between the armature disc 12 and the exciting coil 6 improves the magnetic flux, because this can be realized directly, which also leads to an increased repeated pull-in voltage of the exciting coil 6. Therefore, an improvement of the brake 1 in its temperature response and, for example, use of the brake 1 from −40° C. to +120° C. can be possible.

Figure 2:
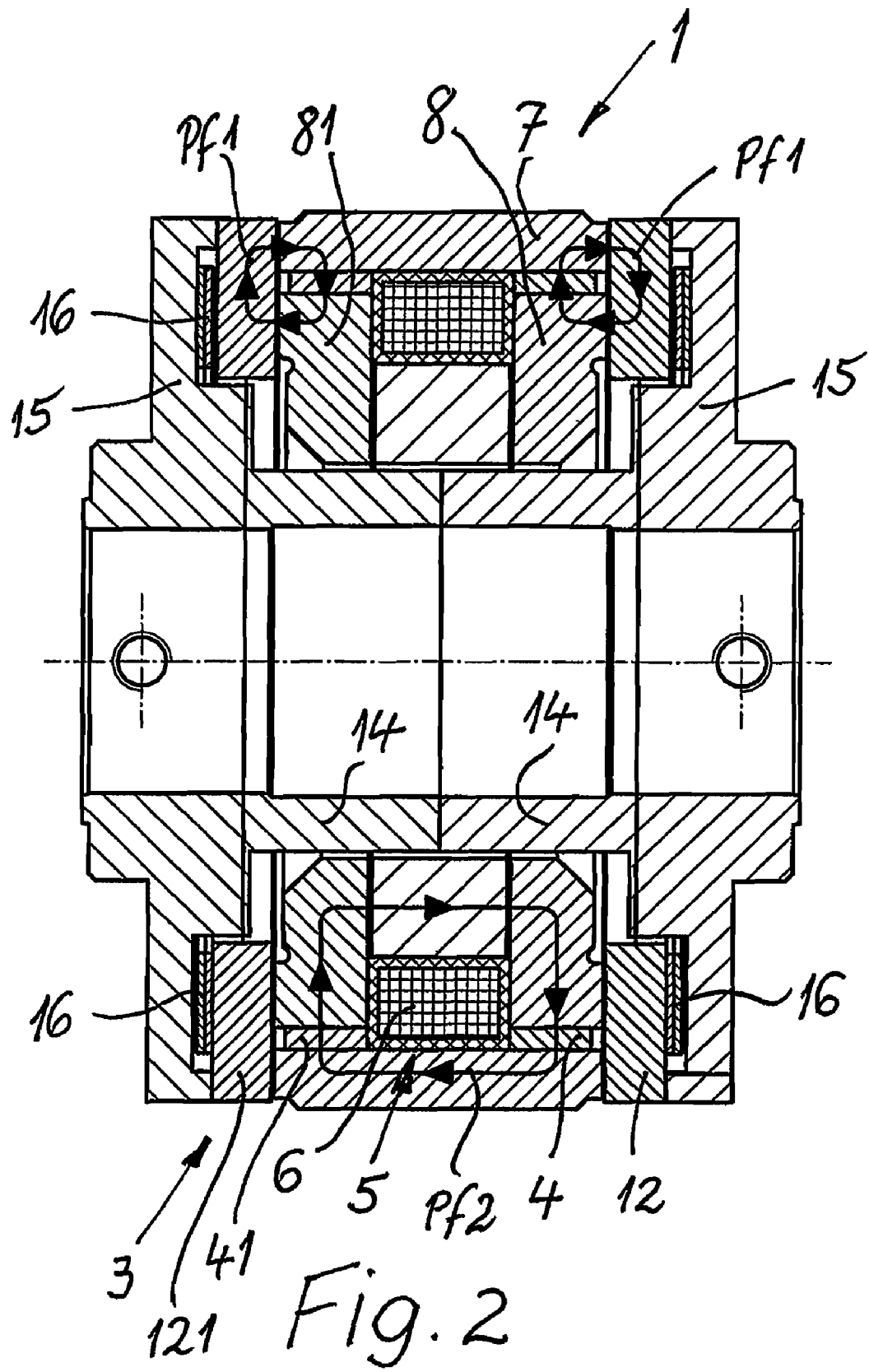

The previously described features and measures can also be seen in the brake 1 according to FIG. 2, which, however, is simultaneously constructed as a double brake. On the side of the exciting coil 6 facing away from the first permanent magnet 4 and the armature disc 12 in the axial direction, there is, namely, a second permanent magnet 41 between the external ring 7 and internal ring, whose radial cross-sectional dimension or cross-sectional thickness d is also smaller than its axial dimension. On the end of this second permanent magnet 41 facing away from the exciting coil 6 there is a second armature disc 121, which acts on the same shaft as the first armature disc 12. In this way, a double brake is produced, for which, however, advantageously only a single electromagnet 5 with one current connection is needed. The total overall length is correspondingly short relative to two brakes acting on the same shaft.

In FIG. 2 one can clearly see that the external ring 7 projects past the exciting coil 6 in two opposing sides in the axial direction and encloses on the outside the first permanent magnet 4 and the second permanent magnet 41. The inside of the second permanent magnet 41 contacts a second internal ring 81, so that the external pole of the second permanent magnet 41 is formed by the external ring 7 elongated in the axial direction and the internal pole is formed by the second internal ring 81.

Here, the second permanent magnet 41 has the same diameter and the same cross-sectional thickness d as the first permanent magnet 4 and aligns with this first permanent magnet 4, as can be seen clearly in FIG. 2. The axial dimension of the second permanent magnet 41 also corresponds to that of the first permanent magnet 4.

In the top half of FIG. 2, the magnetic fields are shown schematically by arrows Pf 1 for a closed brake 1, that is, a non-energized exciting coil 6, from which it is produced that the two permanent magnets 4 and 41, as already mentioned earlier, are magnetized in the radial direction, but each in the reverse or opposite direction.

In the bottom half of FIG. 2, the magnetic field is shown by arrows Pf 2 for an opened brake, that is, an energized exciting coil 6. In this case, the magnetic fields of the permanent magnets are compensated, neutralized, displaced, or deflected, such that the armature discs 12 and 121 are lifted from the brake bodies 3 arranged on both sides by means of spring force.

In the embodiment according to FIG. 2, both permanent magnets 4 and 41 and also their attachments and the interacting parts, especially the armature discs 12 and 121 and/or the springs 16, as well as the brake body 3, are arranged mirror-symmetric to the common electromagnet 5 or to its exciting coil 6 and are constructed, incidentally, in a matching way. This produces consistency in both sides of this double brake, whereby this is suitable for applications with increased safety requirement, for example, for people and cargo elevators, because both sides or halves represent braking systems that are independent from each other and are thus redundant. The release for this double brake according to the representation in the bottom half of FIG. 2 is only a single construction, which, however, is sufficient, because the safe braking state is maintained redundantly when no longer energized.

The electromagnetic brake 1 for an especially electric drive has a brake body 3, which comprises a sleeve-shaped permanent magnet 4, an electromagnet 5 provided with an exciting coil 6, an external ring 7 formed as an external pole, and an internal ring 8 formed as an internal pole, wherein an armature disc 12 locked in rotation with a shaft forms, with the permanent magnet 4, a magnetic circuit via an air gap and can be drawn against the brake body 3 or the end faces of the external ring 7 and the internal ring 8 by the magnetic force of the permanent magnet 4 opposite the force of the restoring springs 16. When the exciting coil 6 is energized, the magnetic field of the permanent magnet 4 is compensated, neutralized, displaced, or deflected, such that the armature disc 12 can be or is lifted from the brake body 3 by a spring force and in this way the brake 1 is released. The radial cross-sectional diameter or cross-sectional thickness d of the permanent magnet 4, that is, the difference between its internal diameter and its external diameter, is here smaller, in particular, considerably smaller, than its axial dimension and the spatial arrangement of the permanent magnet 4—seen in the axial direction—is provided between the armature disc 12 and the exciting coil 6 and here in the radially outer area of the exciting coil 6 or its housing.

Here, the brake 1 can also be formed as a double brake, such that on both sides of the exciting coil 6 there is an approximately sleeve-shaped or collar-shaped permanent magnet 4 and an interacting armature disc 12, and also the other necessary parts of such a brake, preferably in a mirror-symmetric arrangement.

The invention claimed is:

1. Electromagnetic brake (1) for an electric drive, comprising at least one brake body (3), which has at least one permanent magnet (4), at least one electromagnet (5) with an electromagnetic exciting coil (6), an external pole formed as an external ring (7), and an internal pole formed as an internal ring (8), wherein the brake body (3) is locked in rotation with a stator of the electric drive, and also with an armature disc (12), which is locked in rotation with a rotatable shaft of the drive, wherein the armature disc (12) forms a magnetic circuit with the external pole and with the internal pole, and also with the permanent magnet (4) via an air gap, and wherein the armature disc (12) is drawn against the brake body (3) in a first position by a magnetic force of the permanent magnet (4) which overcomes a force of a spring (16), and for the exciting coil (6) in an energized state, the electromagnet (5) compensates, the magnetic field of the permanent magnet (4) at least to the extent that the armature disc (12) is lifted to a second position away from the brake body (3) by the spring force a radial cross-sectional dimension or cross-sectional thickness (d) of the permanent magnet (4) generating the braking force between an internal diameter and an external diameter thereof is smaller than an axial dimension thereof, the permanent magnet (4) is arranged in an axial direction between the armature disc (12) and the exciting coil (6).

2. Brake according to claim 1, wherein the permanent magnet (4) is formed with a sleeve or collar shape.

3. Brake according to claim 1, wherein the permanent magnet (4) is arranged in a radially outer area of the exciting coil (6) or a housing thereof.

4. Brake according to claim 1, wherein the permanent magnet (4) has a sleeve shape arranged between the external ring (7) and the internal ring (8) of the brake body (3) and is magnetized in a radial direction.

5. Brake according to claim 1, wherein an open spacing of the two poles located in the radial direction on both sides of the permanent magnet (4) and formed by the external ring (7) and the internal ring (8) corresponds at least to the radial cross-sectional thickness (d) of the permanent magnet (4).

6. Brake according to claim 5, wherein a minimum spacing of the poles opposite the radial cross-sectional thickness (d) of the permanent magnet (4) is increased, so that a free space is produced between an end of the permanent magnet (4) and the open spacing of the poles.

7. Brake according to claim 6, wherein the open spacing of the poles is closed or filled out with non-magnetic material.

8. Brake according to claim 1, wherein an axial dimension of the permanent magnet (4) exceeds a radial cross-sectional thickness (d) thereof by more than three times.

9. Brake according to claim 1, wherein for generating the spring force acting on the armature disc (12) there is at least one tension spring (16) or one tensioned and riveted or screwed segmented spring arranged on a periphery of the armature disc (12) arranged concentric to the shaft (13), which is arranged on a flange (15), which limits an axial adjustability thereof in terms of the armature disc (12) in an axial direction and which is at a highest radial position on a side of the armature disc (12) facing away from the permanent magnet (4) relative to the shaft (13).

10. Brake according to claim 9, wherein there are a plurality of the segmented springs or tension springs (16) and the flange (15) containing the tension springs (16) or segmented springs is connected integrally to a sleeve (14) locked in rotation with the shaft of the drive, and the armature disc (12) is arranged locked in rotation on an outside of the sleeve (14), but adjustable in the axial direction by the air gap.

11. Brake according to claim 1, wherein the sleeve-shaped or collar-shaped permanent magnet (4) is fixed between the external ring (7) and internal ring (8), such that the external ring (7) is connected to the internal ring (8) by a shrink fit with the permanent magnet (4) being positioned intermediately.

12. Brake according to claim 11, wherein the permanent magnet (4) is made from individual segments arranged one next to the other in a peripheral direction.

13. Brake according to claim 1, further comprising a second permanent magnet (41), having a radial cross-sectional dimension or cross-sectional thickness (d) that is smaller than an axial dimension thereof, arranged between the external ring (7) and internal ring on a side of the exciting coil (6) facing away from the first permanent magnet (4) and the armature disc (12) in the axial direction, and on an end of the second permanent magnet (41) facing away from the exciting coil (6) there is a second armature disc (121), which acts on the same shaft as the first armature disc (12).

14. Brake according to claim 13, wherein the external ring (7) projects past the exciting coil (6) on two opposing sides in the axial direction and encloses the first permanent magnet (4) and the second permanent magnet (41) on outsides thereof and that an inside of the second permanent magnet (41) contacts a second internal ring (81), so that an external pole of the second permanent magnet (41) is formed by the external ring (7) elongated in the axial direction and a second magnet internal pole is formed by the second internal ring (81).

15. Brake according to claim 14, wherein the second permanent magnet (41) has the same diameter and the same cross-sectional thickness (d) as the first permanent magnet (4) and aligns with the first permanent magnet (4).

16. Brake according to claim 15, wherein an axial dimension of the second permanent magnet (41) corresponds to that of the first permanent magnet (4).

17. Brake according to claim 13, wherein both of the permanent magnets (4, 41) and also the attachments and the interacting parts including the armature discs (12, 121) or the springs (16) are arranged mirror-symmetric to the common electromagnet (5) or the exciting coil (6).

* * * * *